US005627524A

United States Patent [19]

Fredrickson et al.

[11] Patent Number: 5,627,524

[45] Date of Patent: May 6, 1997

[54] INFRARED LOCATOR SYSTEM

[75] Inventors: Dennis Fredrickson, Jacksonville; Howard Richmond, Orange Park, both of Fla.

[73] Assignee: Lifecom, LLC, Huntsville, Ala.

[21] Appl. No.: 398,058

[22] Filed: Mar. 2, 1995

Related U.S. Application Data

[63] Continuation of Ser. No. 73,139, Jun. 7, 1993, abandoned.

[51] Int. Cl.[6] .......... H04Q 1/00

[52] U.S. Cl. .......... 340/825.07; 340/825.49; 340/572; 359/154; 367/199

[58] Field of Search .......... 340/825.06, 825.36, 340/825.37, 825.49, 572, 573, 825.07; 359/154, 142; 367/910, 199

[56] References Cited

U.S. PATENT DOCUMENTS

| | | | |
|---|---|---|---|
| 3,439,320 | 4/1969 | Ward | 367/910 |
| 3,805,265 | 4/1974 | Lester | 340/825.49 |
| 4,225,953 | 9/1980 | Simon | 340/825.49 |
| 4,275,385 | 6/1981 | White | 340/825.49 |
| 4,601,064 | 7/1986 | Shipley | 340/825.49 |
| 4,636,950 | 1/1987 | Caswell | 340/825.49 |
| 4,649,385 | 3/1987 | Aires | 367/199 |
| 4,837,568 | 6/1989 | Snaper | 340/825.49 |
| 4,990,892 | 2/1991 | Guest | 340/825.49 |
| 5,062,151 | 10/1991 | Shipley | 340/825.49 |

FOREIGN PATENT DOCUMENTS

| | | | |
|---|---|---|---|
| 0965179 | 3/1975 | Canada | 340/825.49 |

*Primary Examiner*—Brian Zimmerman
*Attorney, Agent, or Firm*—Thomas C. Saitta

[57] ABSTRACT

A locator system comprising a number of unique portable IR transmitter units, each having a unique identity address consisting of a 16 bit data stream with two start bits and a stop bit, a number of fixed IR receiver units, each having a unique identity, and a central data processing computer. The transmitter units transmit in the vertical direction and in the horizontal direction simultaneously. Both the transmitter units and the receiver units contain programmable microprocessors, enabling the transmitter units to be addressed with one of up to 65,535 possible identities and enabling the receiver units to store multiple transmitter unit identities until polled by the data processing computer.

30 Claims, 6 Drawing Sheets

INFRARED LOCATOR SYSTEM

This is a continuation of application Ser. No. 08/073,139 filed Jun. 7, 1993, now abandoned.

BACKGROUND OF THE INVENTION

This invention relates generally to the field of locator systems having multiple individual identity transmitter units and multiple receiver units to receive signals transmitted from the identity transmitter units. More specifically, the invention relates to such systems having data processing means to identify and provide information on the individual identity transmitter units. Even more specifically, the invention relates to such systems where the identity transmitter units send identifying data to the receiver units by infrared (IR) wavelength light pulses.

Systems for locating individual persons or individual equipment within a physical facility such as a hospital or manufacturing plant are known. Early versions, such as taught by Ward in U.S. Pat. No. 3,439,320, utilized ultrasonic transmitters, where each transmitter was tuned to a different frequency. This limited the number of possible identities available to a very small number. Additionally, because the power consumption in the transmitters was high, continual or periodic transmission was not practical and the transmitters were designed to be manually keyed to transmit. Later systems, such as taught by Lester in U.S. Pats. Nos. 3,696,384, 3,729,329, 3,805,227 and 3,805,265, used portable transceiver units which were interrogated by a central transmitter, but these transceivers were very bulky since they had to act as both receivers and transmitters.

It has been discovered that the use of IR transmission is a vast improvement over ultrasonic transmission. IR wavelength light is used for example in remote control devices for operating television or stereo equipment. IR transmission requires less energy, is less susceptible to interference from ambient sources and can be more effectively modulated for data transmission purposes.

One example of an IR transmission and receiver system is taught in U.S. Pat. No. 4,601,064 to Shipley. This is a communication system to automatically establish two-way communication between individual pulse transmitter units and a central controller unit. The individuals carry IR transmitters which transmit automatically and repetitively. Another example is taught by White in U.S. Pat. No. 4,275,385. White's system uses periodic unique IR identification codes emitted from battery powered transmitter units, which are received by overhead mounted IR receiver units. The receiver units also have a unique code, and both are communicated to a central control unit. Both systems use a series of data pulses to create the unique transmitter identities.

The systems referred to above both suffer from a number of drawbacks. The transmitters and receivers of White and Shipley are hard-wired, and as such the identities cannot be changed once a particular unit is built. The transmitted data address is accomplished via amplitude modulation, which requires adjustment of the voltage level. The number of transmitter unit identities is relatively limited, and the range of the receiver units is relatively fixed. The communication between the receiver units and the controller unit is by parallel data through a data and address bus. The receiver units can only store a single identity at any one time.

It is an object of this invention to provide a locator system for personnel and equipment which overcomes the above shortcomings. The system has programmable transmitter units and programmable receiver units. Transmission is via digital pulse modulation with a 16 bit address, and over 65,000 unique identities are available for the transmitter units. Communication between receiver units and the central controller is by serial data stream. The receiver units can store multiple transmitter identities and the range of the receiver units is expandable using slave receivers supplying information to the master receiver unit.

SUMMARY OF THE INVENTION

The invention is a locator system for identifying and tracking a large number of individual persons or equipment within a physical facility. The system comprises a number of portable individual infrared transmitter units, each having a unique identity or address, a number of mounted receiver units positioned throughout the facility, each having a unique identity, and a centralized data processing computer to receive data from the receiver units.

The identifier transmitter units each contain a battery for power, a microprocessor which is programmed with the particular identity unique to that transmitter unit, and means to produce and transmit IR radiation. The identity address is a data stream of digitally pulsed IR light consisting of 16 data bits framed by a pair of start bits and a stop bit. The start bits are timed at a shorter interval than the data bits. The transmitter unit emits IR radiation in both a vertical and horizontal direction, in a non-standard periodic pattern. The system allows for up to 65,535 individual transmitter units, each with unique addresses.

Each IR receiver unit comprises means to receive the transmitted IR pulses, a programmable microprocessor, means to provide an identification to each receiver and means to communicate with a central communications controller computer. The receivers can store a plural number of identifier transmitter addresses, preferably at least 10 to 20 . A receiver unit can be a master unit connected to a number of slave receiver units, the slave receiver units lacking microprocessors, but having the capability of receiving IR transmissions from individual transmitter units and relaying the addresses to the master receiver unit. The receiver unit has the ability to test each received address for validity. The receiver units can operate optically coupled peripherals.

A central communications concentrator comprising a PC receives the data from the receiver units through a number of controller cards. Each communications concentrator contains up to 4 controller cards, and each controller card can handle up to 256 receiver units. The communications concentrators collect and analyze the data, providing both instantaneous locator ability for any individual transmitter unit as well as storing data for analysis of traffic patterns, etc. Plural numbers of communications controllers can be linked to a main computer, creating a system capable of handling any number of receiver units. The communications concentrators periodically poll all the receiver units to gather and update the data information.

DETAILED DESCRIPTION OF THE INVENTION

The identifier transmitter unit 10 utilizes infrared light (IR) to transmit a serial data string of bits in two word format known as an address. The address is received by an IR sensitive receiver unit 20, which forwards the received information to a central computer system 41. The identifier transmitter unit 10 is portable, fully self-contained and self-powered. The identifier transmitter unit 10 is so designed to have a useful power life expectancy of between five and ten years, depending on the byte weight of the address.

Figure 1:
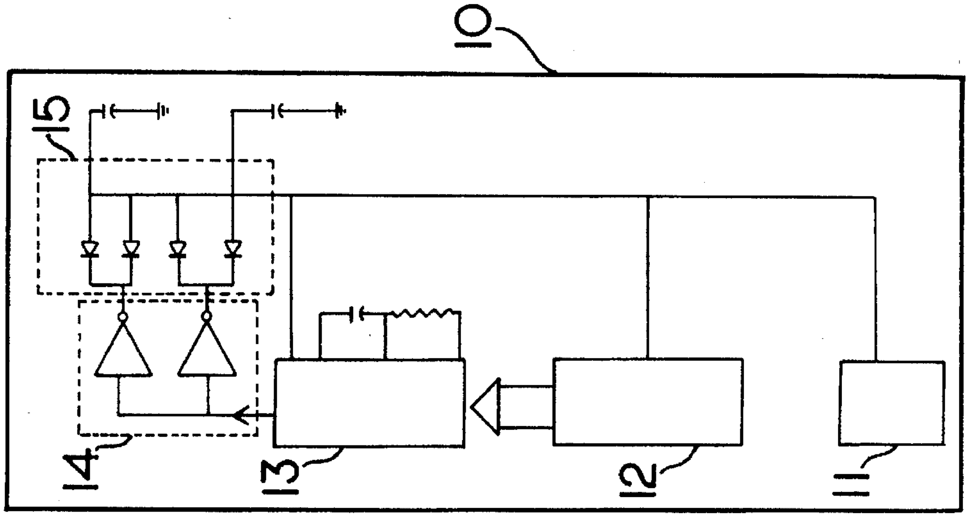
FIG. 1 is a block diagram illustrating the identifier transmitter unit.
Figure 2:
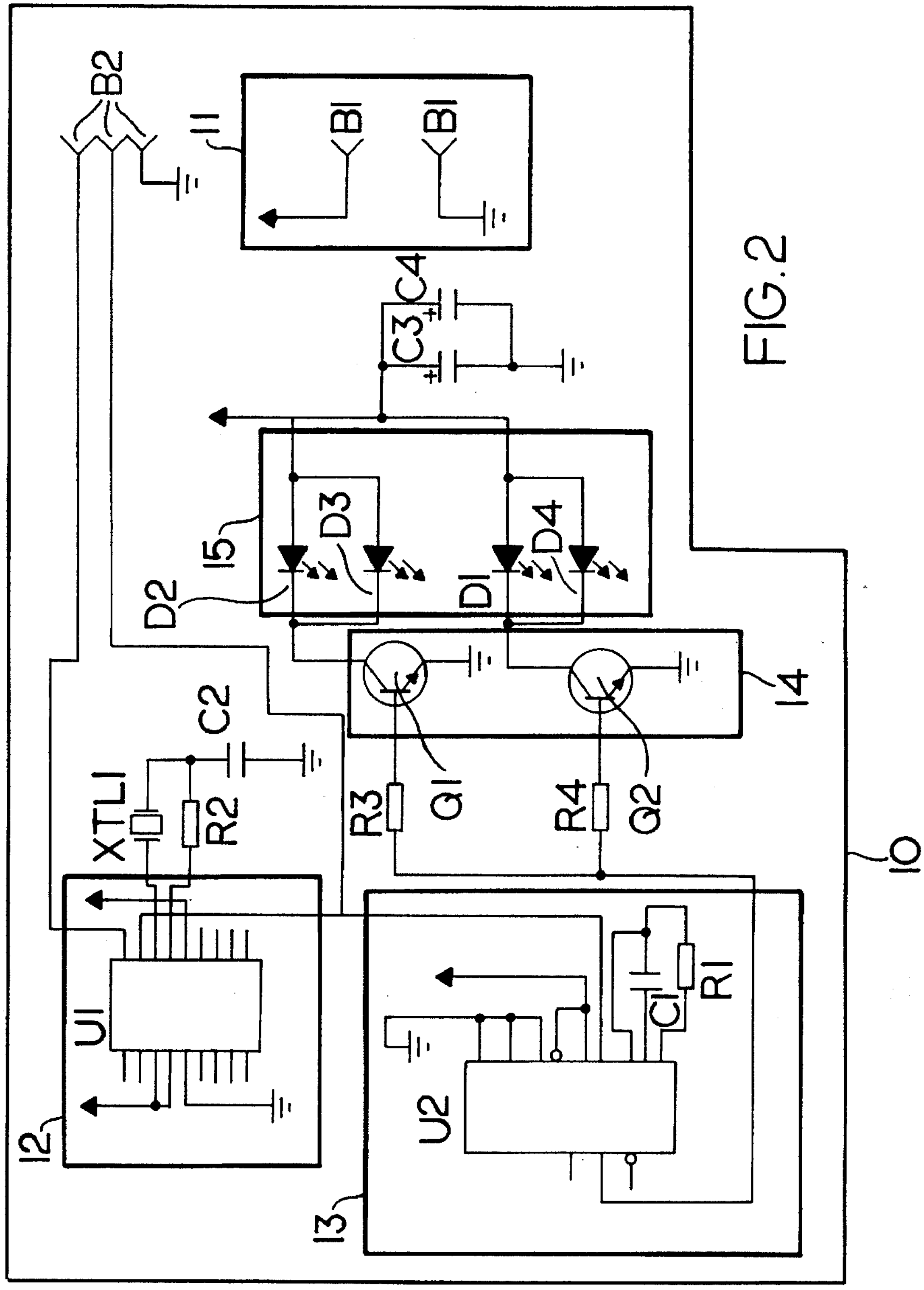
FIG. 2 is a schematic diagram of the identifier transmitter unit.

Referring to FIGS. 1 and 2, a block diagram and schematic are presented for the identifier transmitter unit 10. As shown in FIG. 1, the identifier transmitter unit 10 comprises power supply means 11, microprocessor means 12, pulse shaping means 13, IR driver means 14 and IR light emitting diode (LED) means 15, all connected in circuit as shown in FIG. 2.

Power means 11 is preferably a lithium thionyl chloride cell, identified as B1 in FIG. 2, having a minimum shelf life of ten years, an open circuit voltage of 3.65 volts, a nominal operating voltage of 3.5 volts and a capacity of 1.8 ampere hours. The cell is an AA style with solder tabs and is used in the non-crossover mode such that the barrier breakdown is not reached due to the low current requirements of the transmitter, thereby providing an operating voltage of 3.65 volts. The cell supplies power to the integrated circuits (IC's) U1, U2 and D1-4 of FIG. 2.

Microprocessor means 12, identified as IC U1 in FIG. 2, is programmable to produce a series of data bits which are framed in a specific time domain and configuration to produce a unique address for a particular identifier transmitter unit 10. Microprocessor means 12-may be, for example, an EPROM-based 8-bit CMOS microcontroller such as a Microchip PIC16C54. The microprocessor means 12 should have a very low power consumption, less than 15 micro amperes, and a minimum supply voltage requirement of 3.0 volts DC. Use of a programmable microprocessor 12 allows for 65,535 unique addresses for the identifier transmitter units 10, a number much greater than that available with similar devices. The microprocessor means 12, since it is not hardwired, can be re-programmed if desired to change an identifier address. The address is a particular series of output pulses in the form of a digital word, the address being sent to the pulse shaping means 13 where the bit stream is narrowed from approximately 122 micro seconds to a series of pulses from 5 to 10 micro seconds in width, but at the exact data rate of U1. Pulse shaping means 13, identified as U2 in FIG. 2, may be, for example, a National Semiconductor CD4047BM monostable multivibrator.

The output pulses from pulse shaping means 13 are simultaneously applied to the bases of the two IR driver means 14, shown as transistors Q1 and Q2 in FIG. 2. IR driver means 14 are NPN darlington transistors connected in the common emitter formation, such as for example Digikey FMMTA13. The two IR driver means 14 are used to run two to four IR LED's 15, and are driven by the pulse shaping means 13 by a low to high transition through a low ohmic value base resistor. The collectors of the IR driver means 14 are connected to the cathodes of the IR LED's 15. There are at least two IR LED's 15, one of which is oriented vertically with respect to the identifier transmitter unit and the other of which is oriented horizontally. Each individual transistor Q1 and Q2 drives at least one IR LED 15 which is vertically oriented and at least one IR LED 15 which is horizontally oriented. IR LED's 15, identified as D1, D2, D3 and D4 in FIG. 2, preferably emit IR light at a wavelength of 935 nanometers or above, to a maximum wave length of 1035 nanometers. This narrow output range is preferable to minimize interference from ambient sources of IR light. The anodes of the IR LED's 15 are all connected to the power supply means 11 positive supply post. The supply has 30 microfarad, 4 volt DC capacitors C3 and C4 connected from the +V of the cell to ground and is located very close to the anodes. The value of the capacitors are critical to the battery life and IR transmission efficiency and are selected by the current profile generated with battery impedance, the IR LED's 15 forward current transfer and data rate. The output pulse from the pulse shaping means 13 forward biases the diodes D1 through D4, allowing current to flow to produce an IR burst of light at a given data rate. The intensity of the IR light is proportional to the pulse width of U2 output and directly affects the life of the battery.

Figure 3:
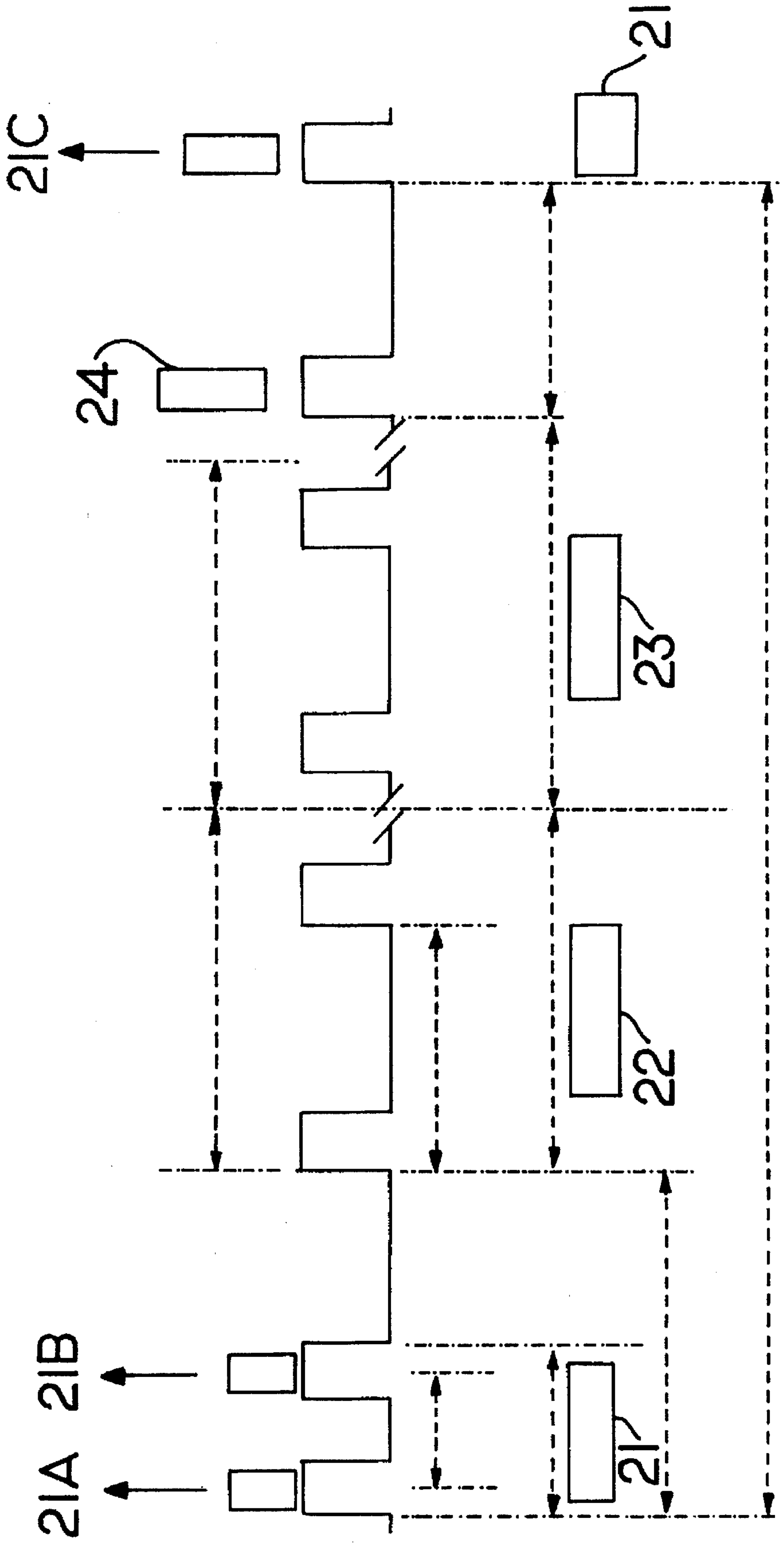
FIG. 3 is an illustration of a pulse serial data transmission string.

Communications between the identifier transmitter unit 10 and the receiver unit 20 is established by way of a custom serial pulse string. This address identifies the particular identifier transmitter unit 10 to the receiver unit 20 and consists of four distinct parts—the framing bits 21, high value byte 22, low value byte 23 and the parity bit 24. An address 92.72 milliseconds in total width is represented in FIG. 3. The framing bit 21 consists of three bits **21*a*, 21*b* and 21*c*. Bits 21*a* and 21*b* are preferably transmitted with an interval much smaller than the interval between data bits, at a preferable interval of 976 microseconds between them. This interval represents one fifth of the 4.99 millisecond interval between the data bits which comprise bytes 22 and 23. A much narrower interval is necessary to insure that the two starting bits 21*a* and 21*b* transmitted from one identifier transmitter unit 10 do not overlap any two data bits being transmitted from a different identifier transmitter unit 10. The stop bit 21*c* frames the end of the transmission string. A period of 4.88 milliseconds after the transmission of the rising edge of start bit 21*a*, the least significant bit of the high value byte 22 is transmitted, followed by the remaining seven data bits of the high value byte 22 at equal intervals. A period of 4.88 milliseconds after transmission of the last bit of high value byte 22, the least significant bit of the low value byte 23 is transmitted, followed by the remaining seven data bits of the low value byte at equal intervals. A parity bit 24 is transmitted 4.88 milliseconds after the last data bit of the low value byte 23, and is used to insure the validity of the transmitted data. The parity bit 24 is set to a logical 1 if all the logical l's in the sixteen bit data string plus the parity bit itself equals an odd number of logical l's. This indicates odd parity checking and it should be noted that the framing bits 21 and parity bit 24 are not part of the data string. A period of 4.88 milliseconds after the transmission of the parity bit 24 the stop bit 21*c*** is transmitted, indicating the end of the serial pulse string.

The transmission of the address by the identifier transmitter unit 10 is set for a unique baud rate so that standard IR transmitter devices, such as remote controls, will not be recognized by the receiver unit 20 and thus cannot cause interference. The data transmission is irregularly timed via use of an algorithm so that each individual identifier transmitter unit 10 will have different intervals between transmissions, although all will transmit at least once every three seconds. For example, a particular identifier transmitter unit 10 may be set to transmit at 1.2 seconds from zero, then at 5.8 seconds from zero, then at 6.6 seconds from zero, with this pattern repeating. A second identifier transmitter unit 10 may be set to transmit at 2.3 seconds from zero, 4.1 seconds from zero and 7.9 seconds from zero, with this pattern repeating. This insures that any chance overlap of 92.72 milliseconds transmissions from two different identifier transmitter units 10 will be corrected within three seconds, such that the next transmission of each transmitter unit 10 will be distinct and non-overlapping.

Figure 4:
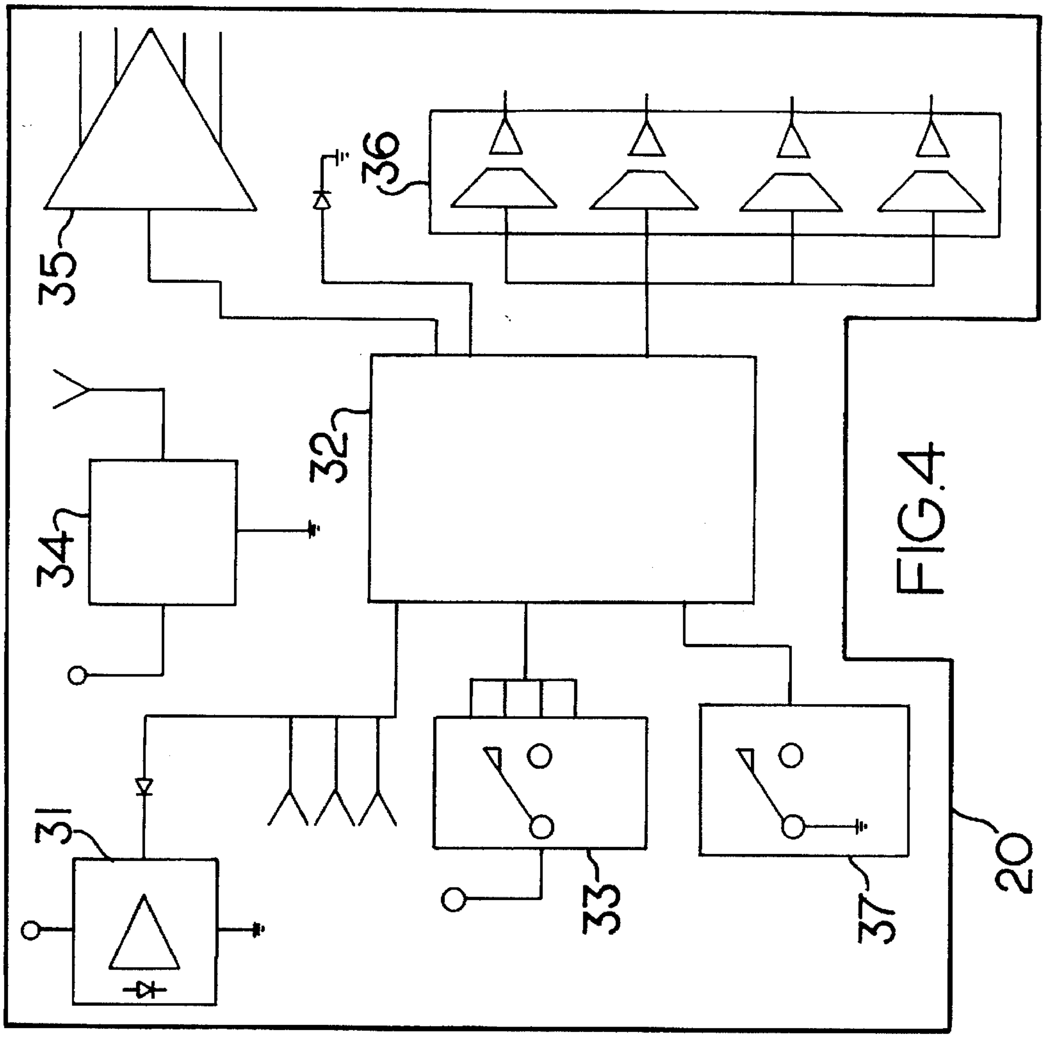
FIG. 4 is a block diagram illustrating the IR receiver unit.
Figure 5:
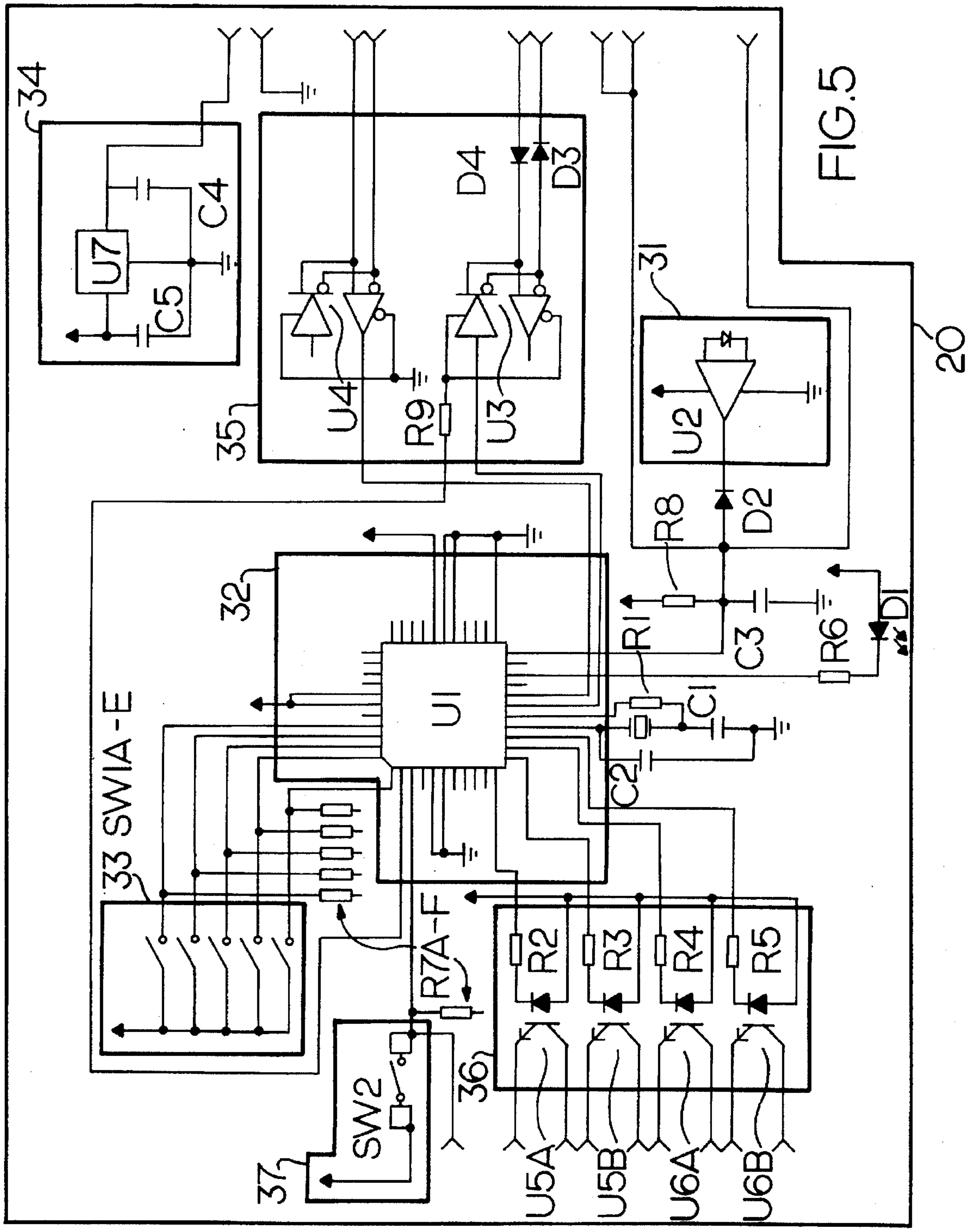
FIG. 5 is a schematic diagram of the IR receiver unit.
Figure 7:
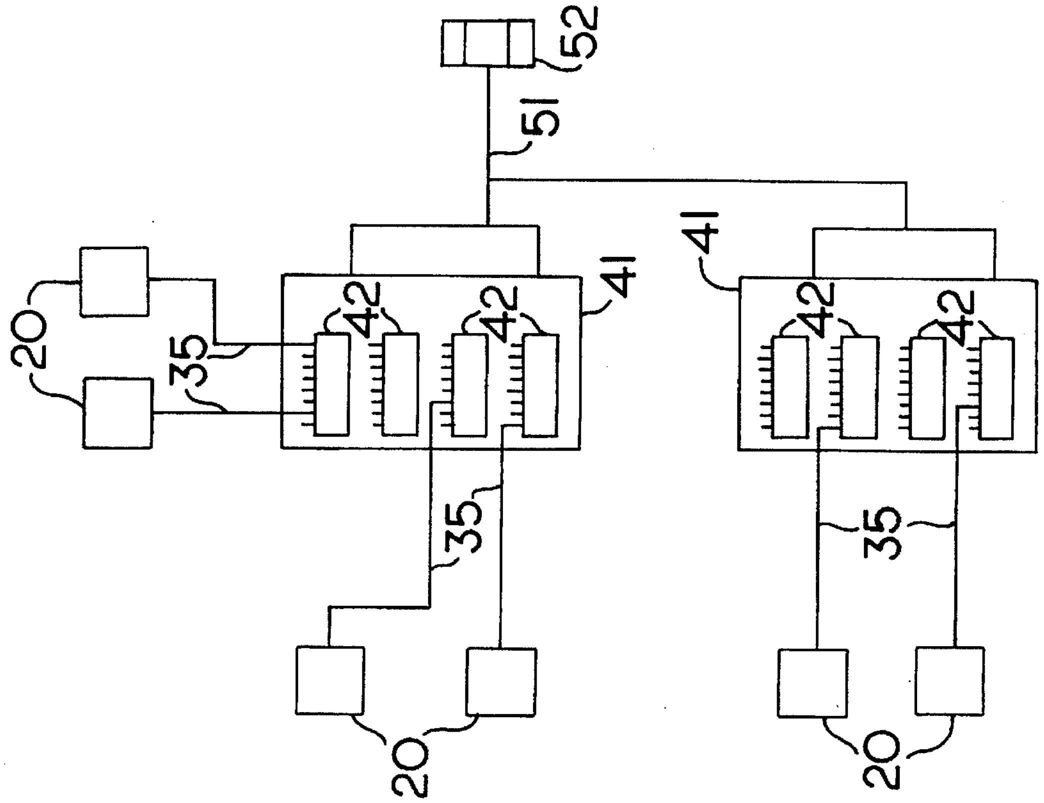
FIG. 7 is a block diagram illustrating the system with multiple communications controllers.
Figure 6:
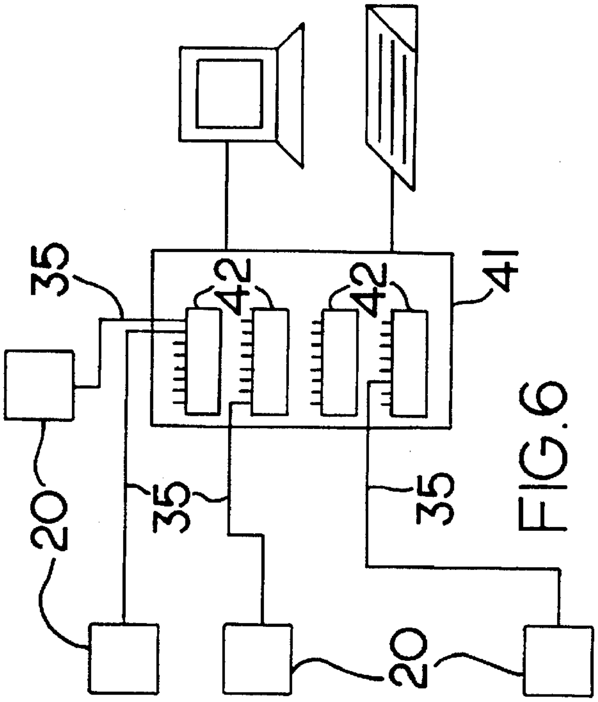
FIG. 6 is a block diagram illustrating the system with a single communications controller.

The IR receiver unit 20 is illustrated by a block diagram in FIG. 4 and a schematic in FIG. 5. The IR receiver unit 20 is designed to be mounted in a room at a location of optimum receptivity for the IR transmissions sent from the identifier transmitter units 10, such as on a ceiling. The IR receiver unit 20 is comprised of IR PIN receivers 31, a programmable microprocessor 32, a set of switches 33 to set a unique address for the particular IR receiver unit 20, a regulator 34 to step down the voltage for the microprocessor 32, and data link means 35 for communication with controller units. Additionally, the IR receiver unit 20 may comprise optically coupled peripheral drivers 36 to operate external devices and a manual reset switch 37 to clear any request messages in the microprocessor 32 memory. The IR receiver unit 20 is a self-contained device having a high gain amplifier and one or more photoinductor network (PIN) diodes 31, shown as U2 in FIG. 5, identified as having a peak spectrum sensitivity of 1000 nanometers and an overall AC gain of greater than 80 dB, such as a Sharp PD410PI. The IR receiver unit 20 is preferably modified to increase the reception sensitivity by affixing a cluster of PIN diodes 31 having the IR wavelength response of 1000 nanometers. The multiple PIN diodes 31 are patterned in triangular, cubical or flat plane configurations, depending on the particular optimum configuration for the particular location of the receiver unit 20. The PIN diodes 31 cluster is enclosed in a hemispherical or bi-directional capsule permeable to IR wavelength transmission. The output of the receiver unit 20 is a negative voltage transition pulse which is directly proportional to the incoming data bit stream transmitted by the identifier transmitter unit 10. The voltage to microprocessor 32 is regulated by regulator 34, such as a Digikey LM340T-5, identified as U7 in FIG. 5, which steps the voltage down to 5 volts. The programmable microprocessor 32, such as PIC 17C42 microchip, identified as U1 in FIG. 5, recognizes the incoming data information, the address, transmitted from an identifier transmitter unit 10. The microprocessor 32 then examines this data by looking for the unique start bit pattern of 21*a* and 21*b*. Once the address is recognized as valid, the microprocessor 32 receives the remainder of the data string. Any erroneous or stray pulses which would change the parity of the received data string will cause the entire data string to be rejected by the microprocessor 32. Valid addresses are stored in the microprocessor register, which is configured to store a multiple number of addresses from a multiple number of identifier transmitter units 10. Preferably, the register is configured to store a minimum of 10 or 20 addresses at any given time. The microprocessor 32 is manually set through the jumpers or switches 33, shown as SW1A through SW1E in FIG. 5, to provide a receiver identifier address unique to each IR receiver unit 20. A PC called the communication concentrator 41, as shown in FIG. 6, coordinates and communicates with the various IR receiver units 20. This communication is via an RS485 serial data link 35, shown as U3 and U4 in FIG. 5. Controller boards 42 within the communications concentrator 41 access the individual IR receiver units 20. Each controller board 42 has 8 ports, each capable of handling 32 IR receiver units 20, for a possible total of 256 IR receiver units 20 per controller board 42. A communications concentrator 41 supports four controller boards, such that a single communications concentrator 41 can access 1024 IR receiver units 20 via standard keyboard and video monitor devices. As shown in FIG. 7, any number of communications concentrators 41 can be linked using an ethernet interface option 51 bussed to a main computer system 52, thereby allowing for a system with an unlimited number of IR receiver units 20.

The communications concentrator 41 poll or interrogate all the receiver units 20 on a continual and periodic basis. It is preferable that each individual receiver unit 20 be polled once every three seconds. At this interval, the microprocessor 32 buffers can be programmed to clear an address after 10 seconds of residence time if no transmission of the same identity address is received within that time frame. If there is a retransmission of the identity address, which occurs from the transmitter unit 10 once every three seconds, the buffer storage timer resets to zero time. In this manner, any identifier transmitter unit 10 which leaves the room containing the receiver unit 20 will register as having left with the communications concentrator 41.

Figure 8:
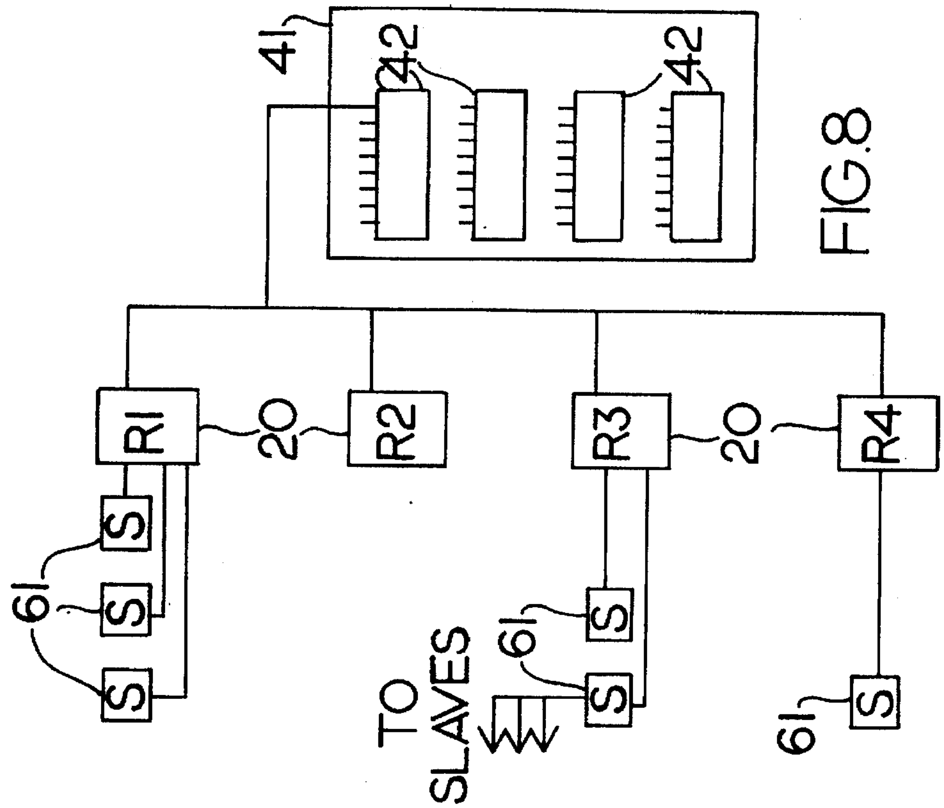
FIG. 8 is a block diagram illustrating the system with slave receiver units connected to IR receiver units.
Figure 9:
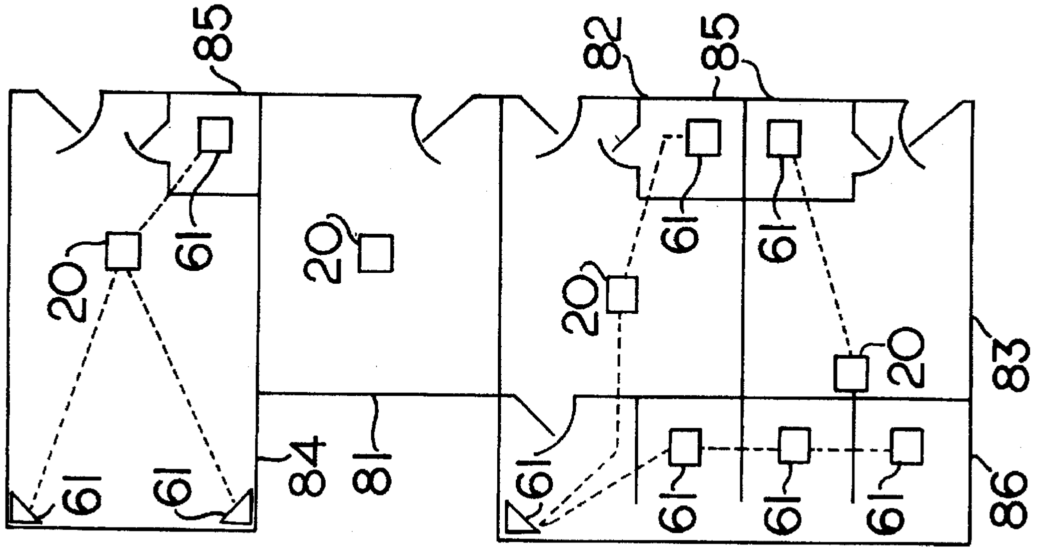
FIG. 9 is a plan layout of rooms illustrating the locations of the slave receiver units and IR receiver units of FIG. 8.

Referring now to FIGS. 8 and 9, an alternative configuration for the system is illustrated. Each IR receiver unit 20, shown as R1, R2, R3 and R4, may be used in conjunction with one or more slave receiver units 61. Slave units 61 are IR receivers without individual microprocessors. The slave unit 61 has an IR receiver, a voltage regulator and a switching diode in series with the output signal. The slave units 61 operate in conjunction with an IR receiver unit 20 and as parallel input to the IR receiver unit microprocessor 32. The slave units 61 do not have RS485 communications capabilities nor can they store identifier transmitter unit 10 addresses, but instead merely communicate received IR transmission data strings to the IR receiver unit 20. The slave units 61 are designed to be positioned in low signal strength areas of a given room such as in closets or bathrooms, as shown in FIG. 9, such that the transmission from an identifier transmitter unit 10 in these areas will still be recognized and stored by the central IR receiver unit 20. As shown in FIG. 9, master receiver unit 20 R1 is positioned in a large room 84, with one slave unit 61 located in a closet or bathroom 85 and two others located in the far corners of room 84. Receiver unit 20 R2 is centrally located in small room 81, with no slave units 61. Receiver unit 20 R3 is positioned in room 82, which contains a closet 85 and a partitioned storage area 86. A single slave unit 61 is positioned in closet 85 and parallel slave units 61 are connected throughout storage area 86. In room 83, a single receiver unit 20 R4 is connected to a single slave unit 61 in closet 85. As shown in FIG. 8, each receiver can be connected to a single port on one controller card 42 in communications concentrator 41.

It is understood that those skilled in the art may well be aware of obvious equivalents or substitutions to the elements and components set forth above. The true scope and definition of the invention therefore is to be as is set forth in the following claims.

We claim:

1. A locator system comprising a number of individual portable transmitter units, a number of individual stationary receiver units, and central data processing means;

said transmitter units each comprising infrared transmission means and programmable microprocessor means such that a unique identity data stream is transmitted by each transmitter unit;

said receiver units each comprising in combination infrared receiving means and programmable microprocessor means remotely separated from said central data processing means such that each said receiver unit has the capability to store multiple said unique identity data streams received from multiple said transmitter units and can communicate said identity data streams to said central data processing means.

2. The system of claim 1, where said unique identity data stream comprises a stream of digitally pulsed infrared radiation consisting of 16 data bits framed by a pair of start bits and a stop bit.

3. The system of claim 1, where each said transmitter unit transmits said identity data stream in a unique non-standard periodic pattern, such that no two said transmitter units transmit with identical periodic patterns.

4. The system of claim 1, where said transmitter units transmit both vertically and horizontally.

5. The system of claim 1, where said transmitter unit microprocessor means is programmed to one of 65,535 possible said unique identity data streams.

6. The system of claim 1, where said receiver unit microprocessor means test each received said identity data stream for validity.

7. The system of claim 1, further comprising a number of slave receiver units connected to individual said receiver units, said slave units comprising infrared receiving means and means to communicate received said identity data streams from said transmitter units to said receiver units, said slave receiver units having no individual microprocessor means.

8. The system of claim 1, where each said transmitter unit repeatedly transmits said identity data stream in a unique non-standard periodic pattern consisting of three transmissions with different time intervals between each of said three transmissions in said pattern, and where no two said transmitter units have identical time intervals between said three transmissions.

9. The system of claim 1, where each said transmitter unit repeatedly transmits said identity data stream once during successive predetermined time periods, with the time interval between each two successive transmissions differing from the time interval between the previous two successive transmissions.

10. The system of claim 1, where at least one said individual remote receiver unit is in communication with one or more slave receiver units, said slave receiver units having no individual microprocessor means and comprising infrared receiving means to receive said identity data streams from said transmitter units and means to communicate received said identity data streams to said at least one said individual remote receiver unit.

11. A locator system comprising a number of individual portable transmitter units, a number of stationary individual remote receiver units, and a central data processing means;

said transmitter units each comprising infrared transmission means and programmable microprocessor means such that a unique identity data stream is transmitted by each transmitter unit;

said individual remote receiver units each comprising a single infrared receiving means and a single programmable microprocessor means, such that the total number of said programmable microprocessor means is equal to the total number of said individual remote receiver units in said locator system, such that each said individual remote receiver unit has the capability to store multiple said unique identity data streams received from multiple said transmitter units and can communicate said identity data streams to said central data processing means.

12. The system of claim 11, where said unique identity data stream comprises a stream of digitally pulsed infrared radiation consisting of 16 data bits framed by a pair of start bits and a stop bit.

13. The system of claim 11, where each said transmitter unit transmits said identity data stream in a unique non-standard periodic pattern, such that no two said transmitter units transmit with identical periodic patterns.

14. The system of claim 11, where said transmitter units transmit both vertically and horizontally.

15. The system of claim 11, where said transmitter unit microprocessor means is programmed to one of 65,535 possible said unique identity data streams.

16. The system of claim 11, where said receiver unit microprocessor means test each received said identity data stream for validity.

17. The system of claim 11, further comprising a number of slave receiver units connected to individual said receiver units, said slave units comprising infrared receiving means and means to communicate received said identity data streams from said transmitter units to said receiver units, said slave receiver units having no individual microprocessor means.

18. The system of claim 11, where each said transmitter unit repeatedly transmits said identity data stream in a unique non-standard periodic pattern consisting of three transmissions with different time intervals between each of said three transmissions in said pattern, and where no two said transmitter units have identical time intervals between said three transmissions.

19. The system of claim 11, where each said transmitter unit repeatedly transmits said identity data stream once during successive predetermined time periods, with the time interval between each two successive transmissions differing from the time interval between the previous two successive transmissions.

20. The system of claim 11, where at least one said individual remote receiver unit is in communication with one or more slave receiver units, said slave receiver units having no individual microprocessor means and comprising infrared receiving means to receive said identity data streams from said transmitter units and means to communicate received said identity data streams to said at least one said individual remote receiver unit.

21. A locator system comprising a number of individual portable transmitter units, a number of stationary individual remote receiver units, and a central data processing means;

said transmitter units each comprising infrared transmission means and programmable microprocessor means such that a unique identity data stream is transmitted by each transmitter unit;

said individual remote receiver units each comprising a paired single infrared receiving means and single programmable microprocessor means, said single programmable microprocessor means being in communication with only one said individual remote receiver unit, such that each said individual remote receiver unit has the capability to store multiple said unique identity data streams received from multiple said transmitter units and can communicate said identity data streams to said central data processing means.

22. The system of claim 21, where said unique identity data stream comprises a stream of digitally pulsed infrared radiation consisting of 16 data bits framed by a pair of start bits and a stop bit.

23. The system of claim 21, where each said transmitter unit transmits said identity data stream in a unique non-standard periodic pattern, such that no two said transmitter units transmit with identical periodic patterns.

24. The system of claim 21, where said transmitter units transmit both vertically and horizontally.

25. The system of claim 21, where said transmitter unit microprocessor means is programmed to one of 65,535 possible said unique identity data streams.

26. The system of claim 21, where said receiver unit microprocessor means test each received said identity data stream for validity.

27. The system of claim 21, further comprising a number of slave receiver units connected to individual said receiver units, said slave units comprising infrared receiving means and means to communicate received said identity data streams from said transmitter units to said receiver units, said slave receiver units having no individual microprocessor means.

28. The system of claim 21, where each said transmitter unit repeatedly transmits said identity data stream in a unique non-standard periodic pattern consisting of three transmissions with different time intervals between each of said three transmissions in said pattern, and where no two said transmitter units have identical time intervals between said three transmissions.

29. The system of claim 21, where each said transmitter unit repeatedly transmits said identity data stream once during successive predetermined time periods, with the time interval between each two successive transmissions differing from the time interval between the previous two successive transmissions.

30. The system of claim 21, where at least one said individual remote receiver unit is in communication with one or more slave receiver units, said slave receiver units having no individual microprocessor means and comprising infrared receiving means to receive said identity data streams from said transmitter units and means to communicate received said identity data streams to said at least one said individual remote receiver unit.

* * * * *